(12) United States Patent
Busch et al.

(10) Patent No.: US 7,684,918 B2
(45) Date of Patent: Mar. 23, 2010

(54) PTO BRAKE CONTROL SYSTEM

(75) Inventors: Jochen Busch, Dimbach (DE); Klaus Zahn, Oestringen (DE)

(73) Assignee: Deere & Company, Moline, IL (US)

( * ) Notice: Subject to any disclaimer, the term of this patent is extended or adjusted under 35 U.S.C. 154(b) by 432 days.

(21) Appl. No.: 11/776,893

(22) Filed: Jul. 12, 2007

(65) Prior Publication Data
US 2009/0018727 A1 Jan. 15, 2009

(51) Int. Cl.
G06F 7/70 (2006.01)
F16H 37/00 (2006.01)

(52) U.S. Cl. ............... 701/50; 74/11; 192/15; 192/144; 477/184; 477/194

(58) Field of Classification Search ............... 701/50; 74/11; 192/144, 15, 12 D, 147; 477/194, 477/184, 186
See application file for complete search history.

(56) References Cited

U.S. PATENT DOCUMENTS

| | | | | |
|---|---|---|---|---|
| 3,507,372 A | * | 4/1970 | Gilbertson et al. | 192/18 R |
| 3,698,524 A | | 10/1972 | Schubert | |
| 4,399,715 A | | 8/1983 | Dziuba et al. | |
| 4,974,711 A | * | 12/1990 | Peterson et al. | 192/12 D |
| 5,299,129 A | * | 3/1994 | Uchida et al. | 701/51 |
| 5,437,355 A | | 8/1995 | Takagi et al. | |
| 5,542,306 A | * | 8/1996 | Fernandez | 74/15.86 |
| 6,131,714 A | | 10/2000 | Bosl et al. | |
| 6,142,274 A | * | 11/2000 | Warner | 192/18 A |
| 7,357,745 B2 | * | 4/2008 | Hidaka et al. | 475/159 |
| 2003/0169176 A1 | * | 9/2003 | Schafer et al. | 340/684 |
| 2004/0211274 A1 | * | 10/2004 | Seipold | 74/11 |
| 2005/0258012 A1 | * | 11/2005 | Graves | 192/15 |
| 2006/0021455 A1 | * | 2/2006 | Seipold | 74/15.6 |
| 2008/0188349 A1 | * | 8/2008 | Romine | 477/92 |
| 2009/0018727 A1 | * | 1/2009 | Busch et al. | 701/50 |

FOREIGN PATENT DOCUMENTS

| | | |
|---|---|---|
| EP | 0 952 027 | 10/1999 |
| GB | 2 052 672 | 1/1981 |
| GB | 2 277 358 | 10/1994 |
| JP | 4-113934 | 4/1992 |

* cited by examiner

Primary Examiner—Khoi Tran
Assistant Examiner—Brian J Broadhead

(57) ABSTRACT

The invention relates to a PTO brake control system. There is a need for an improved and safe PTO brake control system. A PTO may be put into a driven and a non-driven condition an is braked by a PTO brake. A PTO brake control system includes a vehicle speed sensor and an ECU for controlling the PTO brake. The ECU deactivates the PTO brake when the vehicle is stationary and the PTO is not driven. This allows the PTO to be manually rotated to facilitate coupling of the PTO to an implement.

8 Claims, 4 Drawing Sheets

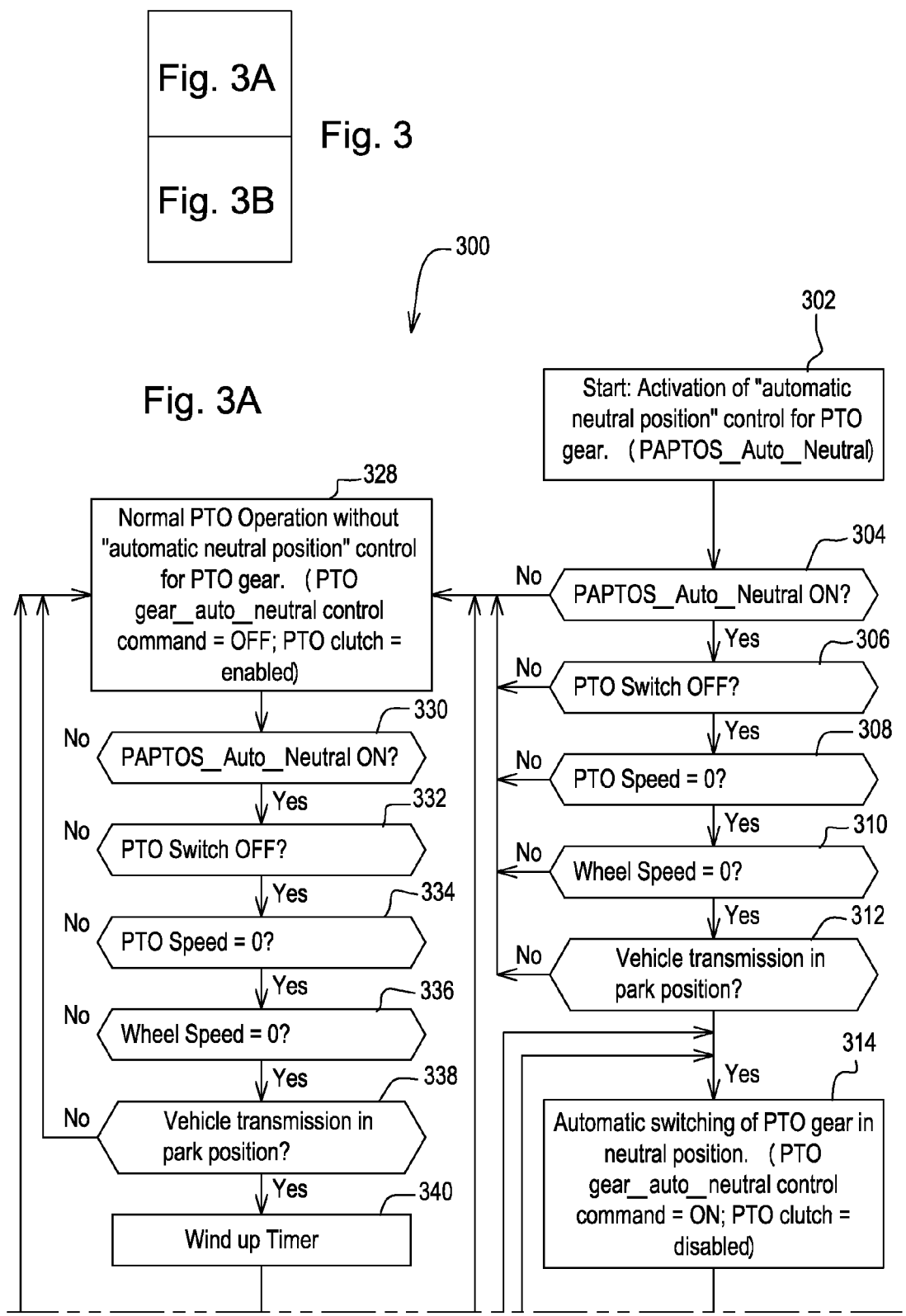

PTO BRAKE CONTROL SYSTEM

FIELD OF THE INVENTION

The present invention relates to a control system for controlling a power take-off (PTO) brake of agricultural vehicle.

BACKGROUND OF THE INVENTION

Agricultural vehicles, such as tractors or agricultural draft vehicles, which have a PTO transmission or a PTO for driving mounted or towed working equipment are conventionally equipped with PTO brakes which are intended to prevent unintentional rotation of the PTO, for example by the PTO drive itself or by the working equipment. For example, when the vehicle is stationary with the engine running and a PTO speed pre-selected, the PTO is switched off, or put into a non-driven condition. At the same time, the PTO brake is activated. When the PTO is switched on again, the PTO brake is disconnected or deactivated.

Conventionally, a PTO speed is pre-selected. Although it is possible to set a neutral position for the PTO or to put the PTO speed to "neutral", it is often the case that a operator forgets to do this, and so the PTO brake is activated when the operator leaves the driver's cab of the vehicle while the engine is running, for example to hook up working equipment and connect it to the PTO. In this case, it is not usually possible to insert the PTO when the working equipment is hooked up, because the PTO or a PTO journal cannot be manually rotated in order to put it in a suitable insertion position with the PTO brake activated. To insert the PTO, the operator must first switch the PTO speed to "neutral" again, inside the vehicle, so that the PTO is deactivated. This can be awkward and unproductive, because the devices mounted are becoming heavier and heavier, and because this disrupts and interrupts hooking up operation.

SUMMARY OF THE INVENTION

Accordingly, an object of this invention is to provide an improved PTO control system.

This and other objects are achieved by the present invention, wherein a PTO control system operates so that when the vehicle is stationary and the PTO is not driven, the PTO brake is deactivated, with the result that the PTO can be rotated manually in the non-driven condition and when the vehicle is stationary. As soon as the operator leaves the vehicle cab, with the vehicle stationary and preferably with the engine running, in order to hook up working equipment, the PTO brake is automatically deactivated by the electronic control unit (ECU), with the ECU detecting vehicle motion (such as with an engine speed sensor or a drive line rotational speed sensor) with the engine running. Corresponding control signals from these or other sensors which sense or detect a vehicle condition of this kind are used by the ECU to generate the appropriate switching signals for the PTO brake.

Preferably, a further sensor senses the PTO angle of rotation when the vehicle is stationary and the PTO is not driven and the PTO brake is deactivated, with the ECU activating the PTO brake when a pre-settable value of the angle of rotation is reached. If, for example, the PTO is manually rotated beyond a certain angle of rotation, this is interpreted as a misuse and the PTO brake is reactivated. This prevents the PTO from rotating beyond a permitted angle of rotation when the vehicle is stationary and preferably with the engine running, when it is rotated for example by the PTO gear or any incorrect switching in the vehicle or for any other uncontrolled reasons. This permitted angle of rotation may be freely selected, depending on the PTO journal or the number of teeth of the PTO (e.g. six teeth around the periphery). For example, manual rotation of the PTO about an angle of rotation of 60° would be sufficient, with six teeth around the periphery, to reach a usable insertion position for the PTO or the PTO journal when the operator hooks up working equipment by inserting the PTO.

The ECU also may operate to activate the PTO brake once a pre-settable time since the PTO has been deactivated has elapsed. This ensures that the PTO would be locked again automatically as soon as a time period is exceeded, with the result that, if working equipment is hooked up unintentionally and the vehicle is left with the engine running by the operator, there is the safety function that deactivation of the PTO brake is cancelled again after a brief (pre-settable) period and the PTO is braked actively again by the PTO brake. To operate the working equipment once hooking up or mounting is complete and the PTO has been inserted, it may be provided that, as soon as the PTO is switched on from the driver's cab or from a switch mounted outside the driver's cab, a PTO speed must be selected using a further switch arranged in the driver's cab or outside the driver's cab first.

Furthermore, the control system may include an operator presence sensor, and the ECU may be programmed to deactivate the PTO brake depending upon this sensor. Preferably, the PTO brake is not deactivated at the outset if the sensor signals that the driver has not left the driver's cab. This provides a safety function, with the result that, for example, misuse by a driver in cab is prevented if mounting work is carried out near the PTO by a second person.

The ECU activates the PTO brake when the vehicle is in motion and the PTO is in a non-driven condition, and deactivates the PTO brake when the vehicle is stationary and the PTO is in a non-driven condition. The ECU controls the PTO brake in response to sensors for vehicle speed, engine speed and PTO rotational speed, and generates control signals for the PTO brake.

The ECU may also operate to activate the PTO brake, if, with the vehicle stationary and the PTO brake deactivated, a predetermined angle of rotation of the PTO is reached. This prevents misuse or the PTO rotating in an uncontrolled or undesirable manner. Thus, beyond a certain predetermined angle of rotation, the PTO brake is activated automatically and the PTO is locked again. Typically, it is sufficient for the PTO to be rotatable about only a fraction of a revolution in order to couple it to a working implement. It is sufficient merely to overcome a difference in the alignment between the teeth of the PTO and the gaps in the teeth of the implement, so that the teeth are aligned with the gaps on insertion. With a PTO shaft with six teeth, this is possible with a maximum angle of rotation of 60°. With a larger number, the angle of rotation would be even smaller. Thus, for example, a maximum size of 60° for the angle of rotation at the PTO with the PTO deactivated and with the vehicle stationary with the engine running is typically sufficient.

Furthermore, the ECU can also operate to activate the PTO brake if a predetermined time is exceeded when the vehicle is stationary and the PTO brake is deactivated. Thus, for safety reasons the PTO brake is only deactivated for a specific, pre-settable length of time. As soon as this time period expires, the PTO brake is reactivated. Moreover, the ECU can also operate so that, as soon as the PTO is switched on from the cab (or from a switch mounted outside the cab) a PTO speed must first be pre-selected before the working equipment can be put in operation.

The ECU can also prevent deactivation of the PTO brake at the outset if a sensor signals that the driver has not left the cab. This ensures that no one, neither driver nor assistant, is inside the cab could cause the PTO to rotate by an erroneous actuations of a switch performed from the driver's cab while work, settings or mounting are being carried out near the PTO.

BRIEF DESCRIPTION OF THE DRAWINGS

FIGS. 3A and 3B are a logic flow diagram of an algorithm executed by the ECU of FIG. 2.

DESCRIPTION OF THE PREFERRED EMBODIMENT

Figure 1:
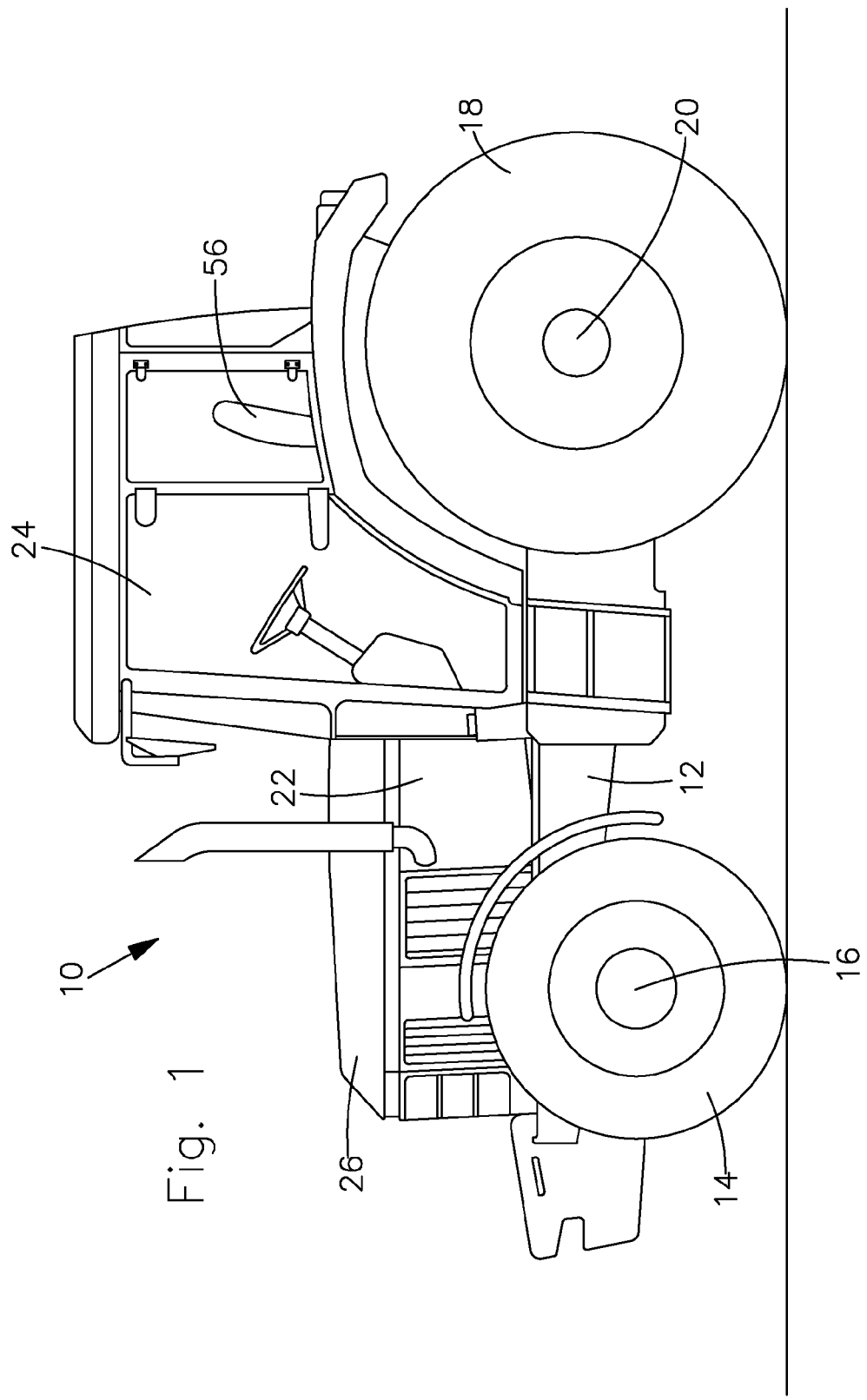
FIG. 1 is a diagrammatic side view of an agricultural vehicle.

In FIG. 1, an agricultural vehicle 10, such as an agricultural draft vehicle or tractor, includes a frame 12 which is carried by a front axle 16, connected to front wheels 14, and a rear axle 20, connected to rear wheels 18. The vehicle 10 further includes a body 22 which is set on the frame 12 and has a driver's cab 24 and an engine bonnet 26.

Figure 2:
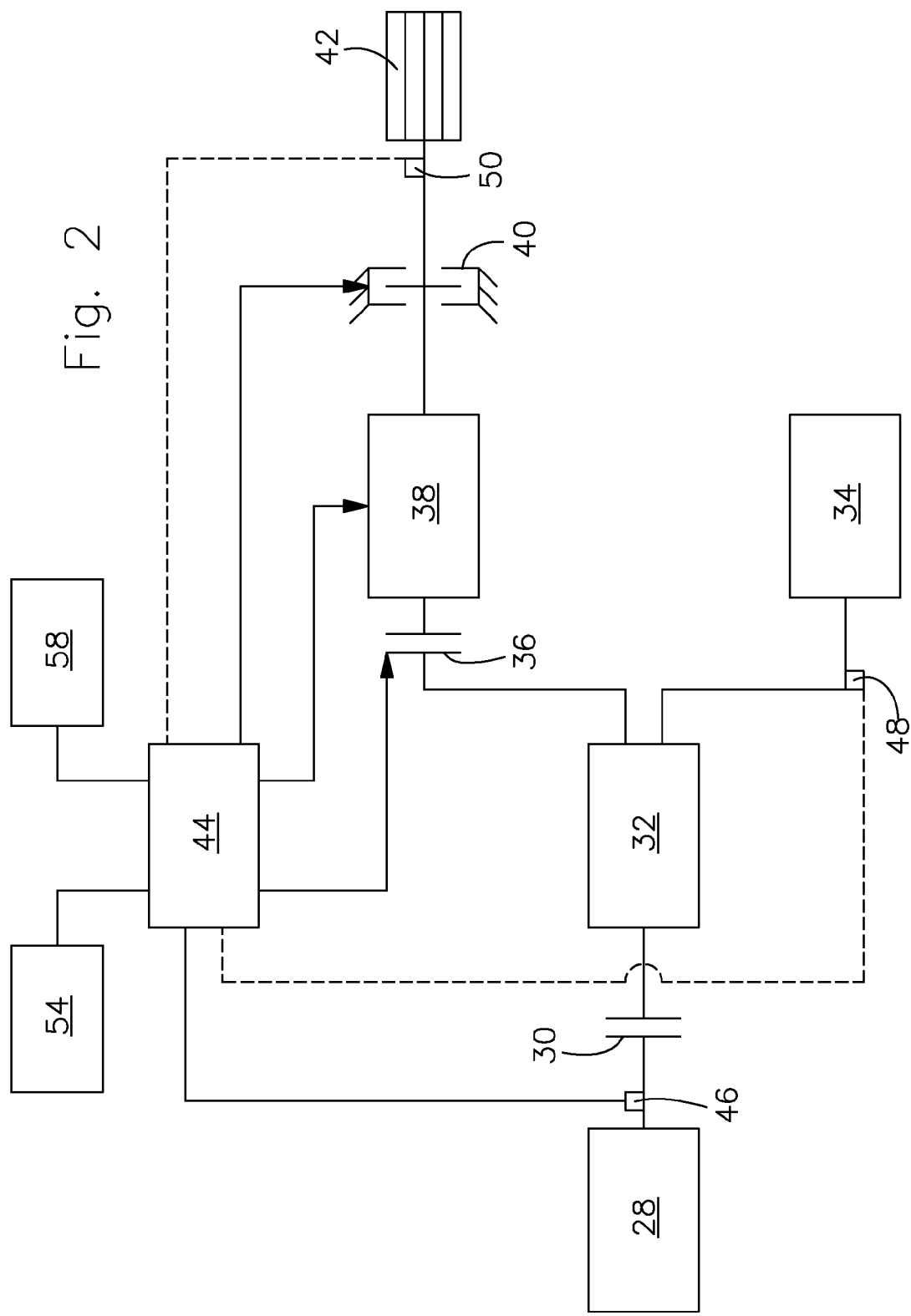
FIG. 2 is schematic diagram of a PTO control system for the vehicle of FIG. 1.

Referring now to FIG. 2, the vehicle 10 also includes a drive motor 28, a drive clutch 30, a transmission 32, drive components 34, a PTO clutch 36, a PTO transmission 38, a PTO brake 40 and a PTO 42. The drive clutch 30 is between the transmission 32 and the drive motor 28. The drive components 34 branch off from the transmission 32. The term "drive components" is intended to include the drive shafts, terminal gears and the other drive components (not shown) which drive the wheels 14, 18.

The PTO line includes the PTO clutch 36, the PTO transmission 38, the PTO brake 40 and the PTO 42, and branches off from the transmission 32, with the PTO clutch 36 being arranged between the transmission 32 and the PTO transmission 38, and the PTO brake 40 being arranged downstream in the direction of drive behind the PTO transmission 38, between the PTO brake 38 and the PTO 42. The PTO transmission 38 may be an integrated gear branch of the transmission 32, and/or the PTO clutch 36 may be arranged downstream in the direction of drive, behind the PTO transmission 38, in which case the PTO brake 40 is arranged between the PTO clutch 36 and the PTO 42.

The PTO clutch 36, the PTO transmission 38 and the PTO brake 40 are controlled by an ECU 44. Alternatively, the PTO clutch 36 and the PTO transmission 38 may be controlled by a separate switching means or control means (not shown) arranged in the driver's cab 24.

A rotational speed sensor 46 senses the engine speed, a speed sensor 48 and a rotational speed sensor 50 senses the PTO speed, and are connected to the ECU 44.

Switching or control means 54 are arranged in the driver's cab 24, and are used by a vehicle driver or operator to generate operator command signals, for example to switch the PTO on and off or to pre-select a PTO speed, and to predetermine other variables relevant to the control.

The ECU 44 receives signals from the sensors 46, 48, 50 and uses them to generate control signals for the PTO brake 40. The ECU is programmed with a control algorithm stored in the ECU 44 so that when the vehicle 10 is stationary (when the speed sensor 48 signals a speed of zero) and when the drive motor 28 is running (when the rotational speed sensor 46 signals a speed greater than zero), the PTO brake 40 is disconnected or deactivated. The control signal for the PTO brake 40 may also depend on the signal from an operator presence sensor 58 positioned at a driver's seat 56 in the cab 24. If the sensor 58 signals that a driver has not left the driver's seat 56, and therefore has presumably not left the driver's cab either, no deactivation of the PTO brake 40 is performed. The sensor 58 may be a simple contact switch or contact sensor, or a pressure sensor or a light barrier.

The ECU 44 operates to activate the PTO brake 40 when the vehicle 10 is moving and the PTO 42 is in a non-driven condition. Furthermore, the ECU is programmed to deactivate the PTO brake 40 when the vehicle 10 is stationary and the PTO 42 is disengaged. The ECU 44 detects and responds to a disengaged PTO 42 when the ECU 44 performs a control action on the PTO clutch 36 and receives a corresponding response signal from the PTO clutch 36 or a clutch sensor (not shown). When the PTO brake 40 is deactivated, the operator may rotate the PTO and bring it into alignment with an implement connector. Although the PTO can only be rotated within a pre-settable angular range, the angle of rotation should, however, be sufficient to enable the required mounting work or coupling, insertion or connection work to be carried out. The angle of rotation is preferably detected by the rotational speed sensor 50. Alternatively, a further sensor (not shown) may be provided which offers higher resolution and detects the precise angle of rotation of the PTO 42 within a revolution. As soon as a pre-set angle of rotation is exceeded, the PTO brake 40 is activated again to prevent misuse, although this restriction is optional. The angle of rotation may be pre-set by the switching or control means 54 in the cab 24, or it could be pre-set by the ECU 44.

Preferably, the PTO brake 40 is deactivated only within a predeterminable period, so that the driver must respond and manually rotate the PTO within this period. In this case the ECU is programmed so that the PTO brake 40 is activated as soon as this period is exceeded. This period may also be pre-set by a switching or control means 54 in the cab 24, or by the ECU 44.

Figure 3B:
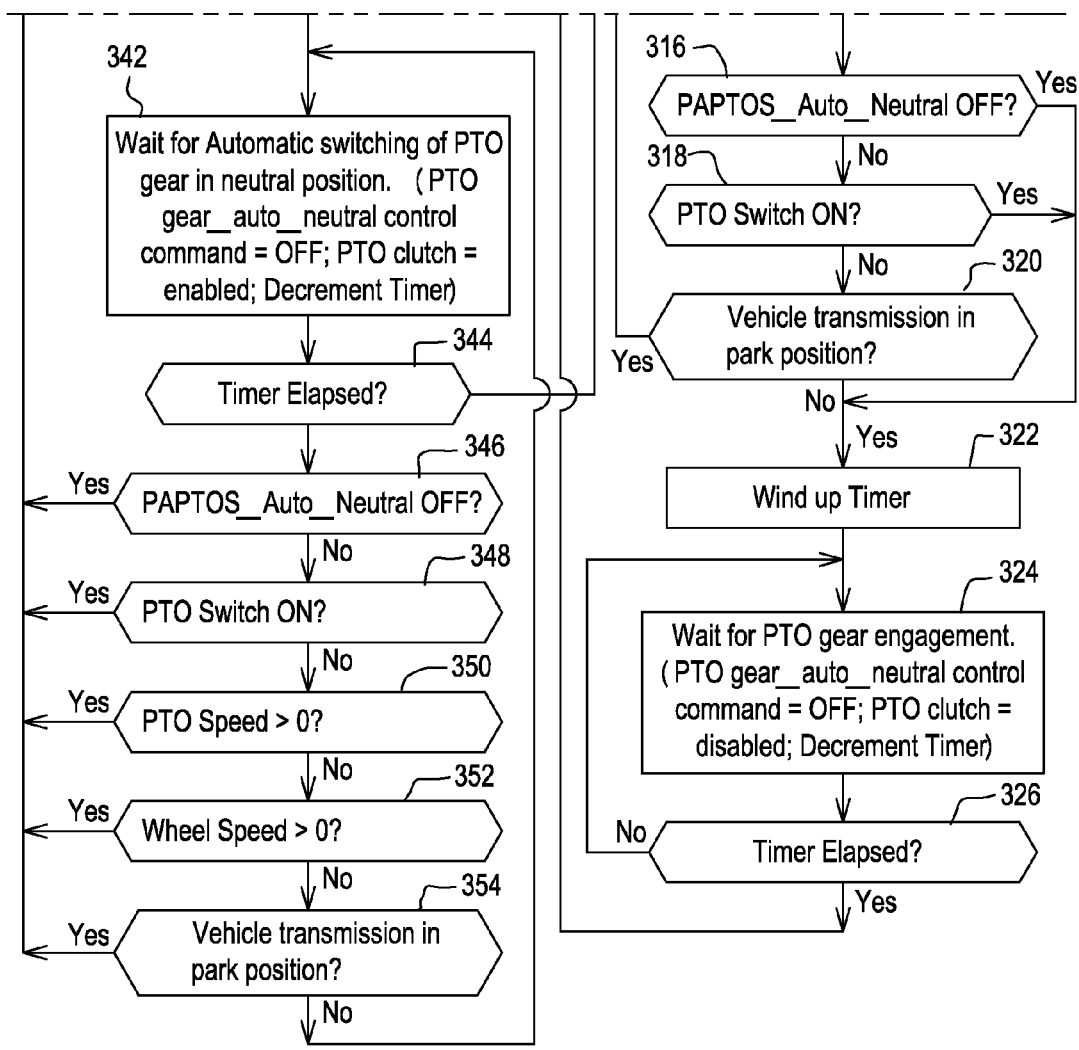

The ECU 44 executes an algorithm 300 represented by FIGS. 3A and 3B. The algorithm begins at step 302 in response to the operator switching an Auto_Neutral switch (not shown) to its ON position. Then in steps 304-312 the algorithm checks the following conditions:

1. Is the Auto_Neutral switch in ON position?
2. Is the PTO deactivated by switching the PTO switch (not shown) in OFF position?
3. Is the PTO speed equal zero (PTO speed sensor (50) signalizes 0)?
4. Is the wheel speed equal zero (wheel speed sensor (48) signalizes 0)?
5. Is the vehicle transmission (32) in park position?

If all of these conditions 1 to 5 are true then in step 314 the PTO transmission will be automatically switched into neutral due to a "PTO gear_auto_neutral control ON" command, which is sent by the controller (44), and the PTO clutch will be opened (disabled).

Otherwise, if one of the above conditions is not true, the automatic switching of the PTO gear into neutral position will not take place and the normal PTO operation mode takes place by closing the PTO clutch (PTO clutch enabled) at step 328.

If the automatic switching of the PTO gear into neutral position takes place, in steps 316-320 the ECU 44 checks the following conditions:

6. Has been the Auto_Neutral switch meanwhile switched into OFF position?
7. Has been the PTO meanwhile activated by switching the PTO switch in ON position?

8. Is the vehicle transmission 32 not in park position anymore?

If one of the conditions 6 to 8 are true then the PTO transmission 38 will be prepared for engagement by starting a timer (wind up timer) in step 322, while in step 324 the ECU 44 sends a "PTO gear_auto_neutral control OFF" command, but not enabling the PTO clutch 36 yet (the clutch is still disabled). Due to a decrementation of a counter the timer will count down until the timer elapsed. When the timer elapsed (step 326) the normal PTO operation mode takes place and the clutch 36 will be enabled (step 328).

During the normal PTO operation mode steps 330-338 check conditions 1-5 again. If all of the conditions 1 to 5 are true then in steps 340-344 operate so that the PTO transmission 38 will be prepared for automatically switching into neutral position by starting a timer (wind up timer), while the controller is still sending a "PTO gear_auto_neutral control OFF" command and the PTO clutch (36) keeping enabled. Due to the decrementation of a counter the timer will count down until the timer elapsed.

During decrementation of the timer steps 346-354 check the following conditions:

9. Is the Auto_Neutral switch in OFF position?
10. Is the PTO activated by switching the PTO switch in ON position?
11. Is the PTO speed greater then zero (PTO speed sensor (50) signalizes>0)?
12. Is the wheel speed greater then zero (wheel speed sensor (48) signalizes>0)?
13. Is the vehicle transmission 32 not in park position?

When one of the conditions 9-13 is true, then the ECU 44 keeps the normal PTO operation mode by starting a new cycle with checking again conditions 1-55 (steps 328-338), start decrementing the timer and checking conditions 9-13 (steps 340-354). The ECU 44 keeps the normal PTO operation mode until the timer elapsed and all of the conditions 9-13 are not true.

If the timer elapsed and all of the conditions 9-13 are not true, then in step 342 the PTO transmission 38 will be automatically switched into neutral position due to a "PTO gear_auto_neutral control ON" command sent by the ECU 44 and the PTO clutch will be opened (disabled). Since the ECU 44 is sending a "PTO gear_auto_neutral control ON" command, the ECU 44 follows the procedure as described above when automatic switching of the PTO transmission 38 into neutral takes place.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications And variations which fall within the spirit and scope of the appended claims.

We claim:

1. An agricultural vehicle PTO control system having an electronically controlled PTO brake, a vehicle speed sensor and an electronic control unit (ECU) connected to the speed sensor and controlling the PTO brake in response to the speed sensor, characterized in that:
   the ECU deactivates the PTO brake when the vehicle is stationary and the PTO is not driven, so that the PTO can be rotated manually in the non-driven condition when the vehicle is stationary.

2. The control system of claim 1, further comprising:
   a sensor for detecting an angle of rotation of the PTO, the ECU activating the PTO brake when the sensor detects that the PTO has reached a pre-settable angle of rotation, when the vehicle is stationary the PTO is not driven and the PTO brake is deactivated.

3. The control system of claim 1, wherein:
   the ECU activates the PTO brake if a pre-settable time since the PTO has been deactivated has elapsed.

4. The control system of claim 1, further comprising:
   an operator presence sensor for sensing an operator's presence in a cab of the vehicle, the ECU controlling the PTO brake is deactivated in dependence upon the operator presence sensor.

5. The control system of claim 1, wherein:
   the ECU activates the PTO brake when the vehicle is in motion and the PTO is in a non-driven condition; and
   the ECU deactivates the PTO brake when the vehicle is stationary and the PTO is in a non-driven condition.

6. The control system of claim 5, wherein:
   the ECU activates the PTO brake if, with the vehicle stationary and the PTO brake deactivated, a the PTO rotates through a predetermined angle of rotation.

7. The control system of claim 5, wherein:
   the ECU activates the PTO brake if a predetermined time is exceeded when the vehicle is stationary and the PTO brake is deactivated.

8. The control system of claim 5, wherein:
   the ECU prevents deactivation of the PTO brake if a operator presence sensor indicates that an operator has not left a cab of the vehicle.

\* \* \* \* \*